United States Patent [19]

Maruta et al.

[11] Patent Number: 5,138,376
[45] Date of Patent: Aug. 11, 1992

[54] IMAGE FORMING APPARATUS INCLUDING CONTROL SYSTEM PROVIDED WITH A MASTER CONTROL UNIT AND A PLURALITY OF SUBSIDIARY CONTROL UNITS

[75] Inventors: Syuzi Maruta; Tadashi Ohira; Kazuhiro Araki, all of Osaka, Japan

[73] Assignee: Minolta Camera Kabushiki Kaisha, Osaka, Japan

[21] Appl. No.: 378,245

[22] Filed: Jul. 11, 1989

[30] Foreign Application Priority Data

Jul. 12, 1988 [JP] Japan .................. 63-173566

[51] Int. Cl.⁵ .............................................. G03G 21/00
[52] U.S. Cl. ....................... 355/204; 355/206; 364/525
[58] Field of Search .............. 355/204, 205, 206, 207, 355/208; 364/200, 525, 900

[56] References Cited

U.S. PATENT DOCUMENTS

| | | | |
|---|---|---|---|
| 4,054,380 | 10/1977 | Donohue et al. | |
| 4,523,299 | 6/1985 | Donohue et al. | 364/200 |
| 4,556,310 | 12/1985 | Masuda | 355/202 |
| 4,750,115 | 6/1988 | Sekiya et al. | 364/200 |
| 4,910,553 | 3/1990 | Suzuki | 355/204 X |

FOREIGN PATENT DOCUMENTS 61-103297 5/1986 Japan .
61-103298 5/1986 Japan .
61-103299 5/1986 Japan .
61-103345 5/1986 Japan .

Primary Examiner—Fred L. Braun
Attorney, Agent, or Firm—Burns, Doane, Swecker & Mathis

[57] ABSTRACT

In an image forming apparatus of the type including a plurality of functional modules each having particular functions proper to the unit, a control system having a master control unit and a plurality of subsidiary control units respectively in control of the individual functional modules wherein each of the plurality of subsidiary control units operates principally under the control of the master control unit through a communication network of the common interface bus type but is operable independently of the master control unit when required or preferred by the subsidiary control unit per se. At least one of the functional modules is provided with a standard mode of operation and a local mode of operation. The standard and local modes are incompatible with one another.

15 Claims, 10 Drawing Sheets

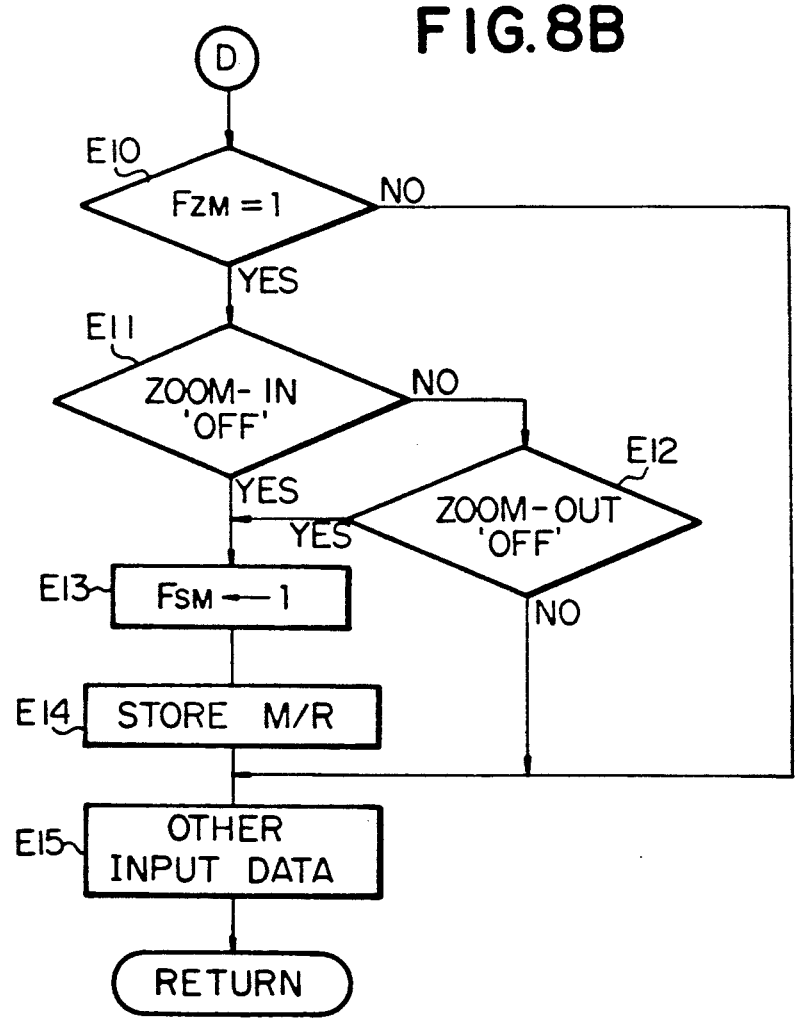

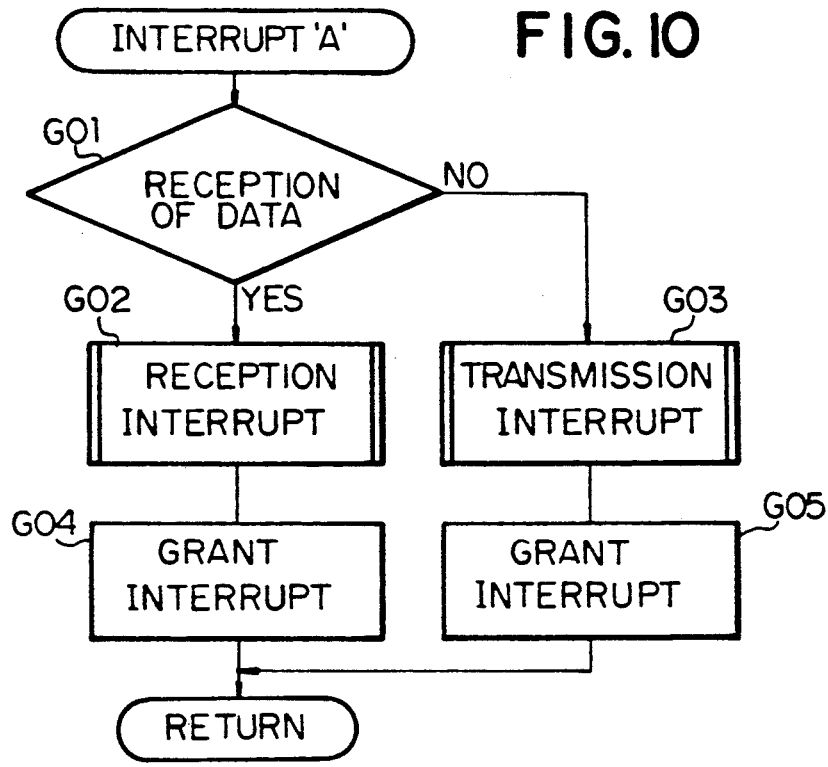
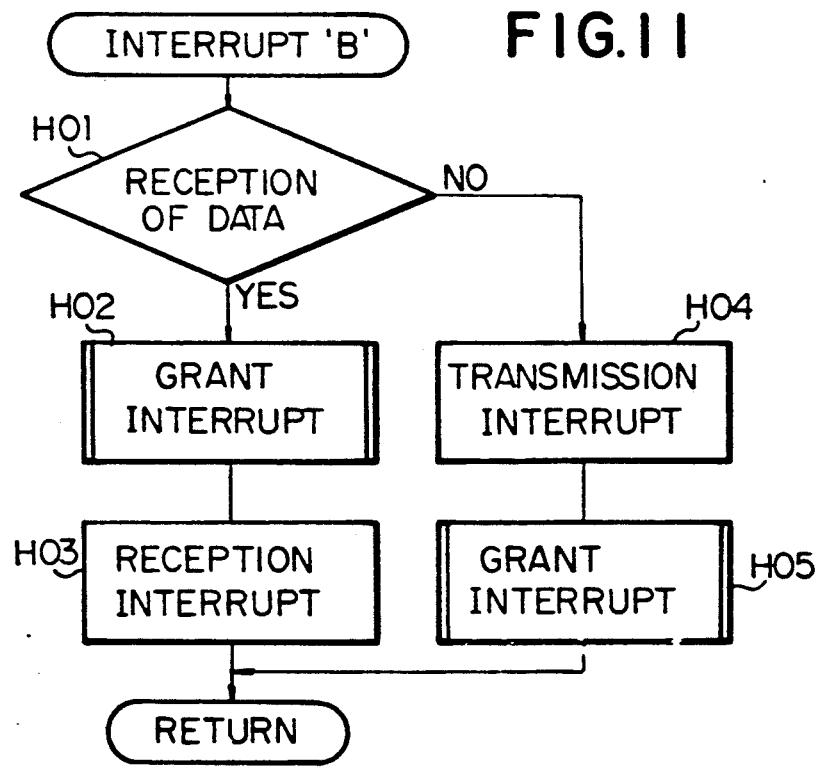

IMAGE FORMING APPARATUS INCLUDING CONTROL SYSTEM PROVIDED WITH A MASTER CONTROL UNIT AND A PLURALITY OF SUBSIDIARY CONTROL UNITS

FIELD OF THE INVENTION

The present invention relates to an image forming apparatus and, more particularly, to an image forming apparatus having a plurality of functional modules each of which is adapted to achieve functions proper to the particular module.

BACKGROUND OF THE INVENTION

Examples of an image forming apparatus of the type having a plurality of functional modules each adapted to achieve particular functions proper to the module include a digital copier and an electrophotographic image duplicating machine. An electrophotographic image duplicating machine, for example, has functional modules including a control panel and a printed output discharge module (hereinafter referred to as page sorter module) in addition to an image reproducing module which is responsible for the reproduction of duplicate images.

Each of the functional modules thus included in such a type of image forming apparatus operates under the control of a subsidiary control unit exclusively associated with the particular functional module. The respective subsidiary control units associated with the individual functional modules in turn are under the control of a single master control unit which is operative not only to control each of the subsidiary control units but to coordinate the operation to be performed by two or more of the functional modules.

For exchange data between the master control unit and each of the subsidiary control units in this type of image forming apparatus, there may be used a data communication network of either the leased transmission line type or the common interface bus type in a control system for the image forming apparatus. In a control system using a communication network of the leased transmission line type, each of the subsidiary control units respectively associated with the different functional modules is electrically coupled to the master control unit through transmission lines proper to the particular subsidiary control unit so that each of the subsidiary control units is permitted to communicate with the master control unit independently of the other subsidiary control units. A communication network of this type however has a drawback encountered when an additional functional module is to be coupled to the apparatus at the user's option. To enable the master control unit of the apparatus to be in control of the additional functional module, additional subsidiary control unit data transmission lines proper to the subsidiary control unit for the additional functional module must be provided and connected to the master control unit.

A drawback of this nature is eliminated in a control system using a communication network of the common bus type in which the respective subsidiary control units associated with the different functional modules are coupled to the master control unit through an interface bus common to the individual subsidiary control units. A particular address is assigned to each of the plurality of subsidiary control units so that the individual subsidiary control units are one after another accessed by the master control unit with the addresses for the subsidiary control units designated successively. A known example of a communication network of this common bus type is taught in Japanese Provisional Patent Publication (Kokai) No. 59-127133.

Each of the main and subsidiary control units of an control system of the described character is typically implemented by a semiconductor microprocessor and is, thus, not only the master control unit but each of the subsidiary control units is capable of executing various functions. This means that each of the subsidiary control units may perform its functions or at least preselected ones of its functions at its own disposal, viz., independently of the master control unit.

SUMMARY OF THE INVENTION

It is, accordingly, a prime object of the present invention to provide in an image forming apparatus of the type including a plurality of functional modules each having particular functions proper to the unit, an improved control system having a master control unit and a plurality of subsidiary control units respectively in control of the individual functional modules wherein each of the plurality of subsidiary control units operates principally under the control of the master control unit through a communication network of the common interface bus type but is operable independently of the master control unit when required or preferred by the subsidiary control unit per se.

An image forming apparatus according to the present invention is of the type including a plurality of functional modules each having particular functions proper to the unit and particularly features an improved control system having a master control unit and a plurality of subsidiary control units respectively in control of the individual functional modules wherein each of the plurality of subsidiary control units operates principally under the control of the master control unit through a communication network of the common interface bus type but is operable independently of the master control unit when required or preferred by the subsidiary control unit per se. The master control unit and each of the subsidiary control units are thus allowed to partake of portions the software programs to be executed by the system as a whole and are accordingly required to bear reduced amounts of burden in communicating with each other.

BRIEF DESCRIPTION OF THE DRAWINGS

The features and advantages of an image forming apparatus according to the present invention will be more clearly appreciated from the following description taken in conjunction with the accompanying drawings in which:

FIGS. 8A and 8B are flowcharts showing the details of an input data process control subroutine program included in the main routine program illustrated in FIG. 7;

FIG. 10 is a flowchart showing the details of one type of interrupt subroutine program predominant over an interrupt of the main routine program illustrated in FIG. 4 or FIG. 7;

FIG. 11 is a flowchart showing the details of another type of interrupt subroutine program predominant over an interrupt of the main routine program illustrated in FIG. 4 or FIG. 7.

DESCRIPTION OF THE PREFERRED EMBODIMENTS

While an image forming apparatus according to the present invention may be embodied in any of various forms as in the form of a digital copier or an electrophotographic image duplicating apparatus, a preferred embodiment of the present invention will be hereinafter described as being applied to an electrophotographic image duplicating machine.

General Construction and Arrangement of Apparatus

Figure 1:
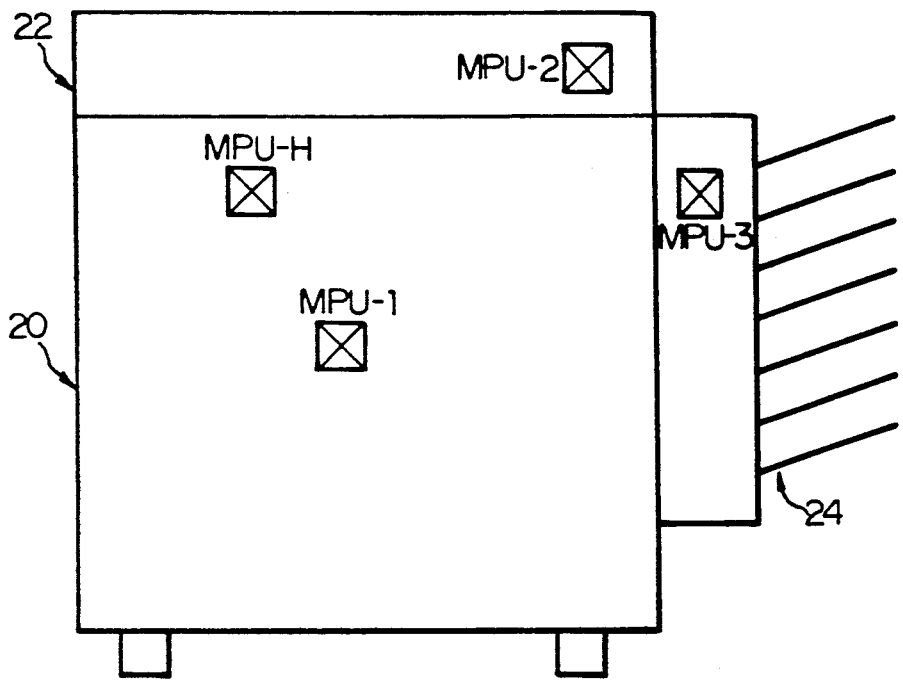
FIG. 1 is a front elevation view schematically showing a typical example of the general construction and arrangement of an electrophotographic image duplicating apparatus embodying the present invention.

FIG. 1 shows a typical example of the general construction and arrangement of an electrophotographic image duplicating apparatus to which the present invention is applied. The image duplicating apparatus largely comprises an image reproducing module 20, a control panel 22, and a page sorter module 24. As well known in the art, the image reproducing module 20 is adapted to optically scan a document loaded into the apparatus and reproduce visible images on a print sheet from the original images on the document optically scanned. The construction and arrangement of this image reproducing module 20 per se is well known in the art and will not be herein described. The control panel 22 has provided thereon various keys, indicators and display windows as will be described. The page sorter module 24 receives print sheets bearing the reproduced visible images from the image reproducing module 20 and automatically assorts the print sheets into a single set of or two or more sets of paginated print sheets. The construction and arrangement of this page sorter module 24 per se is also well known in the art and will not be herein described.

Control Panel

Figure 2:
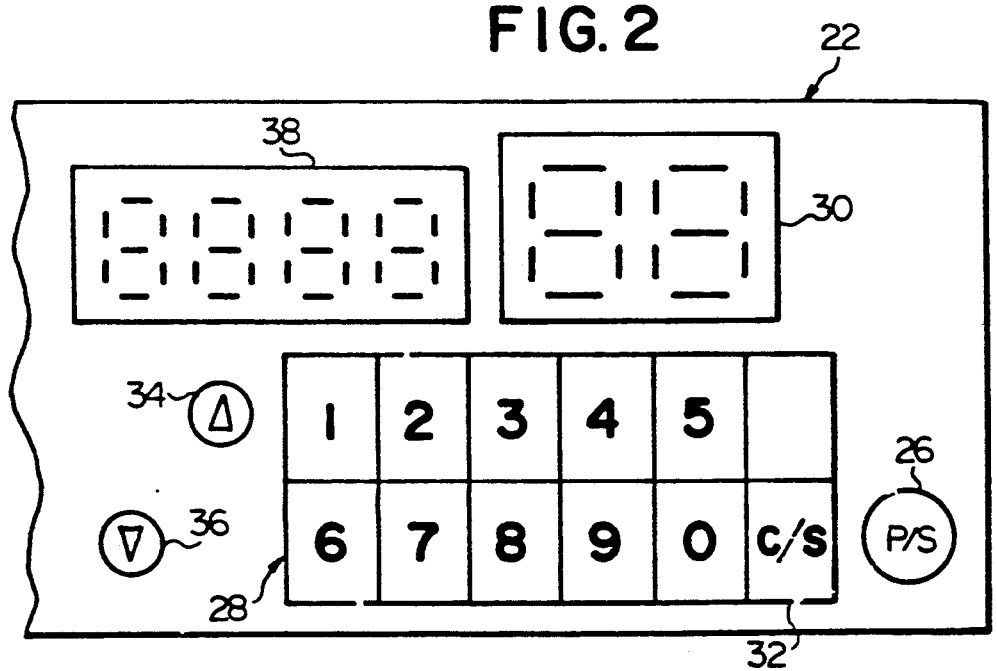
FIG. 2 is a fragmentary plan view showing a portion of a control panel which forms part of the image duplicating apparatus illustrated in FIG. 1.

FIG. 2 shows the arrangement of the keys and displays provided on a portion of a control panel which forms part of the image duplicating apparatus illustrated in FIG. 1.

The keys provided on the control panel 22 include a print start key 26 to enable the apparatus to start duplicating operation and a set of numerical keys 28 allocated to numerals 1, 2, and 0, respectively, and used to enter a selected quantity of printed outputs. The quantity of printed outputs thus entered from the numerical keys 28 is numerically indicated on a first display window 30 of, for example, the seven-segment two-digit type and can be cleared from a clear/stop key 32 (C/S). The clear/stop key 32 may be used also for cancelling the instruction which has once been entered from the print start key 26.

In the control panel 22 herein shown are further provided first and second magnification/reduction control keys 34 and 36 used to vary the magnification/reduction ratio for duplication at predetermined pitches. When the first magnification/reduction control key 34 (hereinafter referred to as zoom-in key) is depressed continuously, the image to be reproduced is magnified or "zoomed out" at a ratio which stepwise increases from the current magnification/reduction ratio. On the other hand, the image to be reproduced is reduced or "zoomed in" at a ratio which stepwise decreases from the current magnification/reduction ratio when the second magnification/reduction control key 36 (hereinafter referred to as zoom-down key) is depressed continuously. The magnification/reduction ratio (herein referred to as magnification ratio) for duplication thus selected through manipulation of the zoom-in key 34 or zoom-out key 36 is numerically indicated on a second display window 38 of, for example, the seven-segment four-digit type and can also be cleared from the clear/stop key 32.

General Circuit Arrangement of Control System

The image forming apparatus embodying the present invention has a control system comprising a master control unit 40 and a plurality of subsidiary control units including first, second and third subsidiary control units 42, 44 and 46. The first subsidiary control unit 42 is particularly associated with and in control of the image reproducing module 20. The second subsidiary control unit 44 is particularly associated with and in control of the control panel 22 and processes the various signals to be received from and supplied to the control panel 22. The third subsidiary control unit 46 is associated with and predominant over the operation of the page sorter module 24. These first, second and third subsidiary control units 42, 44 and 46 are capable of communicating with the master control unit 40 independently of one another and control the operations of the respectively associated functional modules 20, 22 and 24.

In the control system of the image forming apparatus embodying the present invention, there are used two communication networks of different types. Between the master control unit 40 and the second subsidiary control unit 44 in control of the control panel 22 is used a data communication network of the previously mentioned leased transmission line type, while a data communication network of the previously mentioned common interface bus type is used between the master control unit 40 and each of the first and third subsidiary control units 42 and 46 in control of the image reproducing module 20 and page sorter module 24, respectively. Details of the data communication network of the previously mentioned common interface bus type are taught in, for example, Japanese Provisional Patent Publication (Kokai) No. 59-127133 disclosing an example of the polling mode of data communication.

In the polling mode of data communication, a master station herein implemented by the master control unit 40 cyclically sends inquiries to individual terminal or slave stations herein implemented by the first and third subsidiary control units 42 and 46 to check if any of the slave stations currently has data to be transmitted to the master station. When the master station has any data to be sent to one or each of the slave stations, the master station inquires of the slave station or each of the slave stations if the slave station is prepared to receive the data. Depending on the answer to the inquiry thus sent from the master control unit 40 to one or each of the subsidiary control units 42 and 46 or vice versa, data is transmitted from the former to the latter or from the latter to the former.

Figure 3:
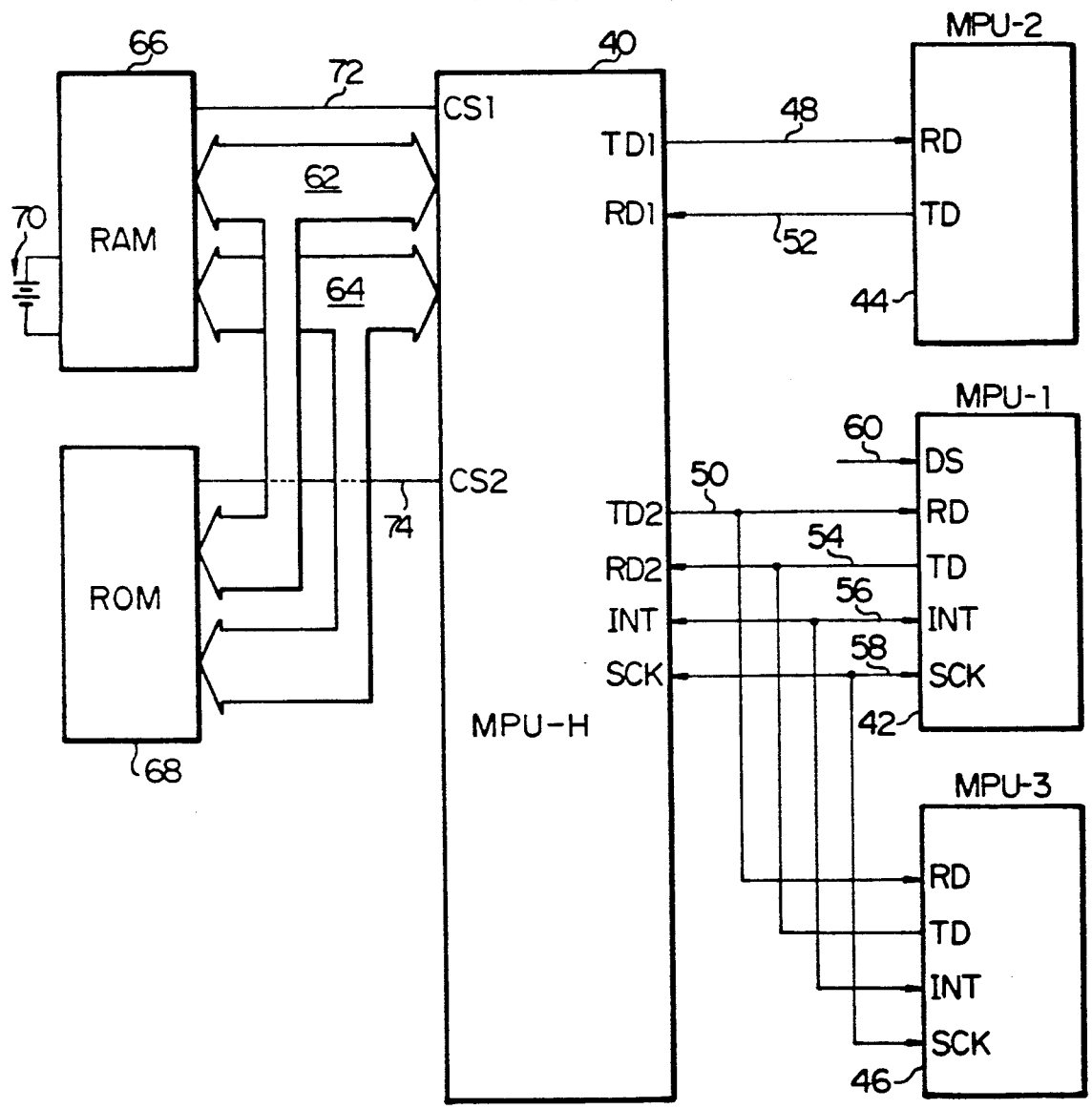
FIG. 3 is a block diagram showing the general circuit arrangement of a control system included in the image forming apparatus embodying the present invention.

FIG. 3 shows the general circuit arrangement of a control system including the master control unit 40 and first, second and third subsidiary control units 42, 44 and 46 as above described. Each of the master control unit 40 and subsidiary control units 42, 44 and 46 of the control system comprises a semiconductor microprocessor such as, as shown, a microprocessor MPU-H forming part of the master control unit 40, a microprocessor MPU-1 forming part of the subsidiary control unit 42, a microprocessor MPU-2 forming part of the subsidiary control unit 44, and a microprocessor MPU-3 forming part of the subsidiary control unit 46.

The microprocessor MPU-H has a first data output port TD1 connected through a serial data transmission line 48 to a data input port RD of the microprocessor MPU-2 and a second data output port TD2 connected through a common bus line 50 to a data input port RD of each of the microprocessors MPU-1 and MPU-3. The microprocessor MPU-H further has a first data input port RD1 connected through a serial data transmission line 52 to a data output port TD of the microprocessor MPU-2 and a second data input port RD2 connected through a common bus line 54 to a data output port TD of each of the microprocessors MPU-1 and MPU-3.

The microprocessor MPU-H further has an interrupt port INT and a system clock port SCK. The interrupt port INT of the microprocessor MPU-H is connected through a common bus line 56 to an interrupt port INT of each of the microprocessors MPU-1 and MPU-3. The system clock port SCK of the microprocessor MPU-H is connected through a common bus line 58 to a system clock port SCK of each of the microprocessors MPU-1 and MPU-3.

The microprocessor MPU-1 of the subsidiary control unit 42 in control of the image reproducing module 20 in particular further has a plurality of failure detect signal input terminals which is herein represented by a single port DS. The failure detect signal input terminals thus represented by the port DS are connected through lines 60 to various sensors and detectors (not shown) located within the image reproducing module 20 to receive signals indicative of the occurrences of failures which may be invited within the module 20. Typical of such failures occurring within the image reproducing module 20 is the jamming of a print sheet being conveyed through the module 20 toward the page sorter module 24. In response to a failure detect signal thus received from any of such sensors and detectors provided in the image reproducing module 20, the subsidiary control unit 42 generates failure detect data and sends the failure detect data to the master control unit 40 by way of the common bus line 54.

In the control system illustrated in FIG. 3, the microprocessor MPU-H is connected through an address bus 62 and a data bus 64 to a random-access memory 66 (RAM) and a read-only memory 68 (ROM). The random-access memory 66 (hereinafter referred to simply as memory 66) provides logic address spaces to be managed by the microprocessor MPU-H and, thus, has output data storage areas of an appropriate configuration. This memory 66 is provided with a backup or refreshing power supply source 70 which is adapted to retain the data stored in these data storage areas of the memory 66. The read-only memory 68 (hereinafter referred to simply as memory 68) has fixedly stored therein the various routine and subroutine programs to be executed by the microprocessor MPU-H. Each of the microprocessors MPU-1, MPU-2 and MPU-3 also has associated random-access and read-only memories basically similar in function to these memories 66 and 68 associated with the microprocessor MPU-H but are not herein shown for brevity of illustration.

The microprocessor MPU-H further has chip select ports CS1 and CS2 connected through lines 72 and 74 to the memories 66 and 68, respectively. Either the memory 66 or the memory 68 is thus selectively enabled by means of the microprocessor MPU-H.

Description will be hereinafter made in regard to the operation of the image forming apparatus embodying the present invention including the master control unit 40 and subsidiary control units 42, 44 and 46 arranged in the control system generally constructed as hereinbefore described.

Each of the image reproducing module 20 and page sorter module 24 exclusively has a standard mode of operation in which each of the subsidiary control units 42 and 46 operates under the control of the master control unit 40. In contrast to such functional modules 20 and 24, the control panel 22 is allowed to select either the standard mode of operation or a local mode of operation. The subsidiary control unit 44 in the standard mode operates under the control of the master control unit 40 and, thus, the control panel 22 operates under the control of the master control unit 40 via the subsidiary control unit 44 associated therewith. When the local mode of operation is selected by the control panel 22, the subsidiary control unit 44 in control of the control panel 22 is out of control by the master control unit 40 and, thus, the control panel 22 operates solely under the control of the subsidiary control unit 44 associated therewith. In the description to follow, it will be assumed that the local mode which may thus be selected by the control panel 22 is the mode of operation in which a magnification ratio for duplication is to be designated from the control panel 22. As has been described with reference to FIG. 2, the magnification ratio can be increased or decreased through manipulation of the zoom-in or zoom-out key 34 or 36 provided on the control panel 22. Thus, the local mode of operation to be selected by the control panel 22 is the mode of operation allowing entry of data through manipulation of the zoom-in or zoom-out key 34 or 36 and will be hereinafter referred to as zoomed magnification ratio select mode.

The local mode which may be selected by the control panel 22 is exclusive to the standard mode of each of the modules 20, 22 and 24, especially, the image reproducing and page sorter modules 20 and 24. Thus, when the local mode or, in this instance, the zoomed magnification ratio select mode is established in the control panel 22, neither the image reproducing module 20 nor the page sorter module 24 could not operate in the standard mode of operation. Furthermore, when the zoomed magnification ratio select mode of operation is requested by the control panel 22 in which the standard mode of operation has been established, the standard mode of operation in the control panel 22 is interrupted and is immediately substituted by the zoomed magnification ratio select mode of operation.

Main Routine Program for MPU-H

Figure 4:
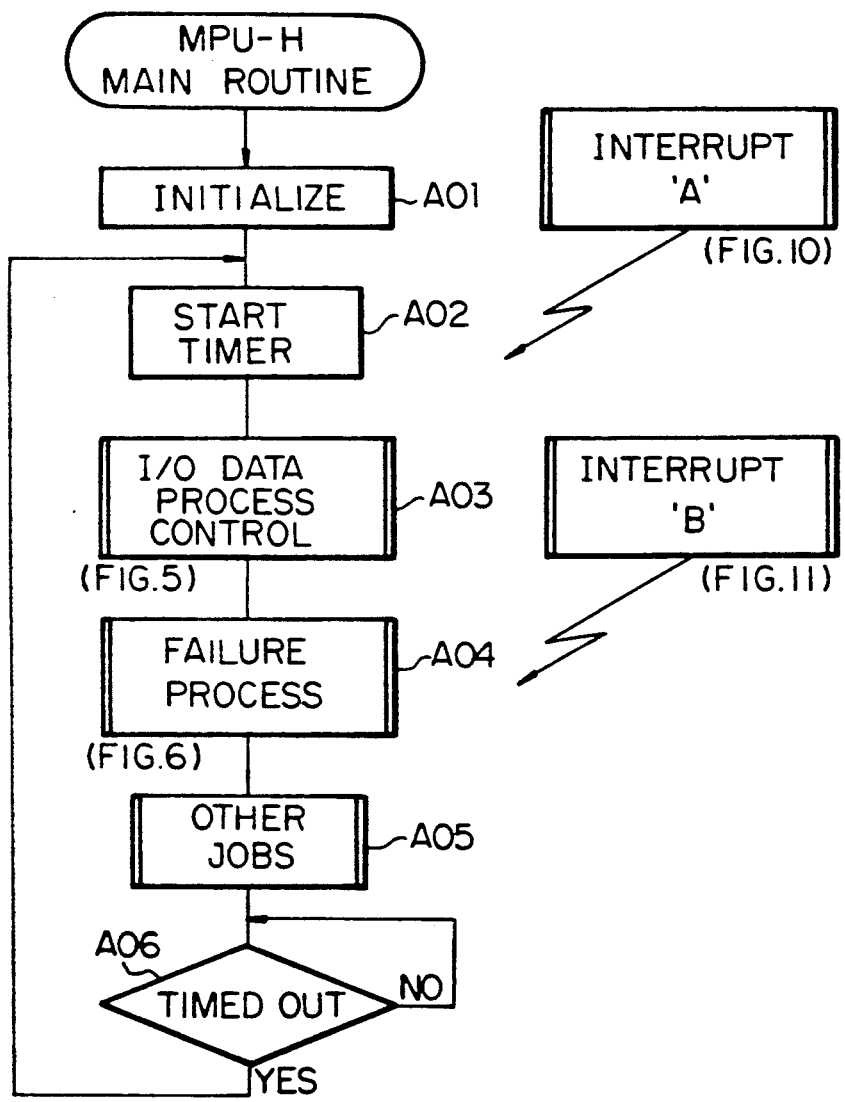
FIG. 4 is a flowchart showing a main routine program to be executed by a microprocessor forming part of a master control unit included in the control system illustrated in FIG. 3.

FIG. 4 shows the main routine program to be executed by the microprocessor MPU-H included in the master control unit 40. The routine program starts to run with the image forming apparatus switched in and first initializes the microprocessor MPU-H and the memory 66 associated therewith so that all the conditions and modes of operation to be controlled by means of the master control unit 40 are selected in accordance with prescribed "default" rules. An internal timer of the microprocessor MPU-H is then initiated into at step A02 to count a predetermined time interval allowed for a single complete iteration of the routine program.

The microprocessor MPU-H may then execute an input/output data process control subroutine program A03 through which the microprocessor MPU-H examines the data which may have been received from any of the subsidiary control units 42, 44 and 46, especially, the subsidiary control unit 44 which has the two different modes of operation. Having examined the data from any of the subsidiary control units 42, 44 and 46, the microprocessor MPU-H generates data to be transmitted to any of the subsidiary control units 42, 44 and 46 and, if necessary, load the received data into the memory 66 or fetch any data from the memory 66 for relay to any of the subsidiary control units 42, 44 and 46. The details of this input/output data process control subroutine program A03 will be hereinafter described with reference to FIG. 5.

The input/output data process control subroutine program A03 is followed by a failure process subroutine program A04 to check for a failure detect signal supplied to the port DS of the microprocessor MPU-1 in the subsidiary control unit 42 from any of the sensors and detectors provided in the image reproducing module 20. In the presence of such a failure detect signal supplied to the microprocessor MPU-1, the microprocessor MPU-H controls the subsidiary control unit 44 to invalidate the zoomed magnification ratio select mode which may have been established in the control panel 22 and newly establish the standard mode. The microprocessor MPU-H then stores into an output data storage area of the memory 66 the data indicating the shift from the zoomed magnification ratio select mode to the standard mode. Thereafter, the microprocessor MPU-H interrupts the operation which may be currently in progress in any of the subsidiary control units 42, 44 and 46 to send to the subsidiary control unit the data thus stored into the output data storage area of the memory 66. The details of this failure process subroutine program A04 will be hereinafter described with reference to FIG. 6.

Subsequently to the failure process subroutine program A04, the microprocessor MPU-H executes a subroutine program A05 to process various data signals supplied from the subsidiary control units 42, 44 and 46 while generating data predominant over the operation of the subsidiary control units 42, 44 and 46. When it is thereafter confirmed at step A06 that the predetermined time interval which has been set at step A02 has lapsed, the microprocessor MPU-H reverts to the step A02 and recycles the subroutine programs A03 to A06.

For the transmission of data from the master control unit 40 to any of the subsidiary control units 42, 44 and 46 or vice versa, the data which the microprocessor of the control unit as the intending data transmitter is about to transmit to the intended destination is first stored into an output data storage area of the memory associated with the transmitter control unit. Then, the microprocessor in the transmitter control unit interrupts the operation currently in progress in the intended destination control unit. The destination control unit thus interrupted fetches data from an output data storage area of the memory associated with the destination control unit and transmits the data to the transmitter control unit which now acts as a data receiver control unit.

In the presence of a request for interrupt to the microprocessor MPU-1 or the microprocessor MPU-3 from the microprocessor MPU-H or conversely from the microprocessor MPU-1 or the microprocessor MPU-3 to the microprocessor MPU-H, there is generated an interrupt of the type "A". This interrupt of the type "A" is generated on supply of a system clock from the port SCK of the microprocessor MPU-H to the port SCK of the microprocessor MPU-1 or MPU-3 or from the port SCK of microprocessor MPU-1 or MPU-3 to the port SCK of the microprocessor MPU-H through the common bus line 58. In the presence, on the other hand, of a request for interrupt to the microprocessor MPU-2 from the microprocessor MPU-H or conversely from the microprocessor MPU-2 to the microprocessor MPU-H, there is generated an interrupt of the type "B". The interrupt of the type "B" from the microprocessor MPU-H to the microprocessor MPU-2 is generated on transmission of the request for interrupt from the first data output port TD1 of the microprocessor MPU-H to the data input port RD of the microprocessor MPU-2 through the serial data transmission line 48. The interrupt of the type "B" from the microprocessor MPU-2 to the microprocessor MPU-H is generated on transmission of the request for interrupt from the data output port TD of the microprocessor MPU-2 to the first data input port RD1 of the microprocessor MPU-H through the serial data transmission line 52.

When there is a request for interrupt of either the type "A" or the type "B", the microprocessor included in the control unit requested to interrupt its operation temporarily brings an end to the operation currently in progress and executes either the interrupt "A" routine program or the interrupt "B" routine program. The details of these interrupt "A" and interrupt "B" routine programs will be hereinafter described with reference to FIGS. 10 and 11, respectively. As a microprocessor capable of executing the interrupt of the type "B" is operable the product muPD7810HG of NEC Corporation.

Input/Output Data Process Control Subroutine (A03)

Figure 5:
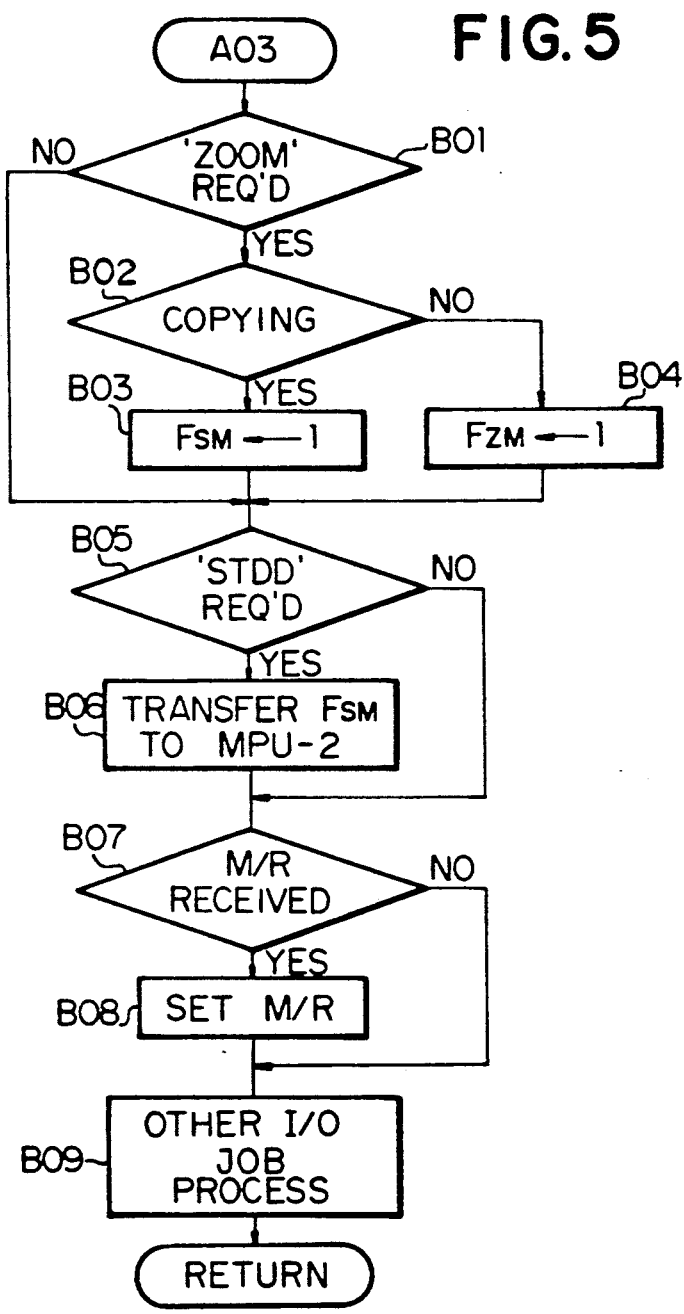
FIG. 5 is a flowchart showing the details of an input/output data process control subroutine program included in the main routine program illustrated in FIG. 4.

FIG. 5 is a flowchart showing the details of the input/output data process control subroutine program A03 included in the main routine program illustrated in FIG. 4.

The input/output data process control subroutine program A03 herein shown starts with a decision step B01 at which the microprocessor MPU-H of the master control unit 40 checks if data requesting the selection of the zoomed magnification ratio select mode is received from the subsidiary control unit 44. This request for the selection of the zoomed magnification ratio select mode of operation is generated when either the zoom-in key 34 or the zoom-out key 36 on the control panel 22 is depressed by the operator. The microprocessor MPU-H in receipt of the data then determines whether or not the selection of the particular mode of operation is currently acceptable.

If it is found at this step B01 that the data requesting the selection of the zoomed magnification ratio select mode is received from the subsidiary control unit 44, the microprocessor MPU-H proceeds to step B02 to check if copying operation is currently in progress in the image reproducing module 20. If it is found at this step B02 that copying operation is in progress in the image reproducing module 20, the microprocessor MPU-H proceeds to step B03 to set a standard mode grant flag $F_{SM}$ to logic value "1" to prohibit establishment of the zoomed magnification ratio select mode. The microprocessor MPU-H stores data including the standard mode grant flag $F_{SM}$ into an output data storage area of the memory 66 so as to be prepared to transmit the data to the microprocessor MPU-2. As will be described in detail, the data including the standard mode grant flag $F_{SM}$ thus set at the logic value "1" is to be transmit to the microprocessor MPU-2 by way of the serial data transmission line 48 through execution of the interrupt "B" routine program by the microprocessor MPU-H.

On the other hand, if it is found that the answer for the step B02 is given in the negative, then the microprocessor MPU-H in the master control unit 40 proceeds to step B04 to set a zooming mode grant flag $F_{ZM}$ to logic value "1" to allow establishment of the zoomed magnification ratio select mode. The microprocessor MPU-H stores data including the zoomed-magnification-ratio select mode grant flag $F_{ZM}$ into an output data storage area of the memory 66 so as to be prepared to transmit the data to the microprocessor MPU-2. The data including the zooming mode grant flag $F_{ZM}$ thus set at logic value "1" is also to be transmit to the microprocessor MPU-2 by way of the serial data transmission line 48 through execution of the interrupt "B" routine program. Upon receipt of the zooming mode grant flag $F_{ZM}$ of logic value "1", the microprocessor MPU-2 establishes the zoomed magnification ratio select mode to process the data generated through manipulation of the zoom-in key 34 or zoom-out key 36, as will be described in mode details (step E02 of subroutine program D03, FIGS. 8A and 8B).

When the microprocessor MPU-H is thus made ready to transmit either the standard mode grant flag $F_{SM}$ or the zooming mode grant flag $F_{ZM}$ to the microprocessor MPU-2 upon execution of the step B03 or step B04, respectively, the microprocessor MPU-H proceeds to step B05 to check if data requesting the selection of the standard mode is received from the microprocessor MPU-2. This step B05 is executed also when it is found that the answer for the step B01 is given in the negative. It may be noted that the request for the selection of the standard mode of operation is generated when either the zoom-in key 34 or the zoom-out key 36 is released after the key has once been depressed by the operator.

If it is found at step B05 that the data requesting the selection of the standard mode is received from the microprocessor MPU-2 and as such the answer for the step B05 is given in the affirmative, the microprocessor MPU-H proceeds to step B06 at which the standard mode grant flag $F_{SM}$ of logic value "1" stored in the memory 66 is transferred via the serial data transmission line 48 to the microprocessor MPU-2 through execution of the interrupt "B" routine program. Subsequently to this step B06 or if it is found at step B05 that there is no data requesting the selection of the standard mode of operation received from the subsidiary control unit 44, the microprocessor MPU-H proceeds to step B07 to confirm whether or not data indicating the magnification ratio selected during the latest zoomed magnification ratio select mode of operation is received from the microprocessor PMU-2.

If it is found at this step B07 that the data indicating the magnification ratio selected during the latest zoomed magnification ratio select mode is received from the microprocessor MPU-2, the microprocessor MPU-H proceeds to step B08 to store the data indicating the selected magnification ratio into an output data storage area of the memory 66 so as to be ready send the data to the microprocessor MPU-1 in control of the image reproducing module 20. The data is to be transmitted from the microprocessor MPU-H to the microprocessor MPU-1 via the common bus line 50 through execution of the interrupt "A" routine program by the microprocessor MPU-H. The microprocessor MPU-1 in receipt of this data control the image reproducing module 20, particularly, the optical scanning system system of the module 20 to establish the magnification ratio indicated by the data thus received by the microprocessor MPU-1.

Upon termination of the step B08 or when it is found that the answer for the step B07 is given in the negative, then the microprocessor MPU-H proceeds to step B09 to process various pieces of other data which the microprocessor MPU-H may have received from or have to transmit to each of the microprocessors MPU-1, MPU-2 and MPU-3. These various pieces of data may include the data generated through manipulation of the print start key 26, numerical keys 28 and/or clear/stop key 32 on the control panel 22 and the data to activate one or both of the first and second display windows 30 and 38 on the control panel 22.

Upon termination of the step B09, the microprocessor MPU-H reverts to the main routine program illustrated in FIG. 4 and may execute the failure process subroutine program A04.

Failure Process Subroutine (A04)

Figure 6:
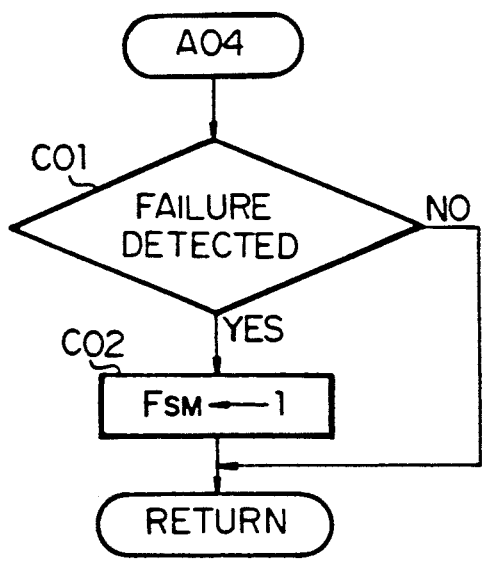
FIG. 6 is a flowchart showing the details of a failure process subroutine program also included in the main routine program illustrated in FIG. 4.

FIG. 6 is a flowchart showing the details of the failure process subroutine program A04 also included in the main routine program illustrated in FIG. 4.

The failure process subroutine program A04 herein shown starts with a decision step C01 to check if there is data indicating that a failure detect signal is received by the microprocessor MPU-1. If it is found at this step C01 that there is no such data received from the subsidiary control unit 42, the microprocessor MPU-H jumps over step C02 and immediately returns to the main routine program illustrated in FIG. 4. If it is found that the answer for the step C01 is given in the affirmative, the microprocessor MPU-H proceeds to step C02 to set the standard mode grant flag $F_{SM}$ to logic value "1". The microprocessor MPU-H stores data including the flag $F_{SM}$ into an output data storage area of the memory 66 so as to be prepared to transmit the data to the microprocessor MPU-2 for prohibiting establishment of the zoomed magnification ratio select mode. Upon termination of the step C02, the microprocessor MPU-H returns to the main routine program illustrated in FIG. 4.

Main Routine Program for MPU-2

Figure 7:
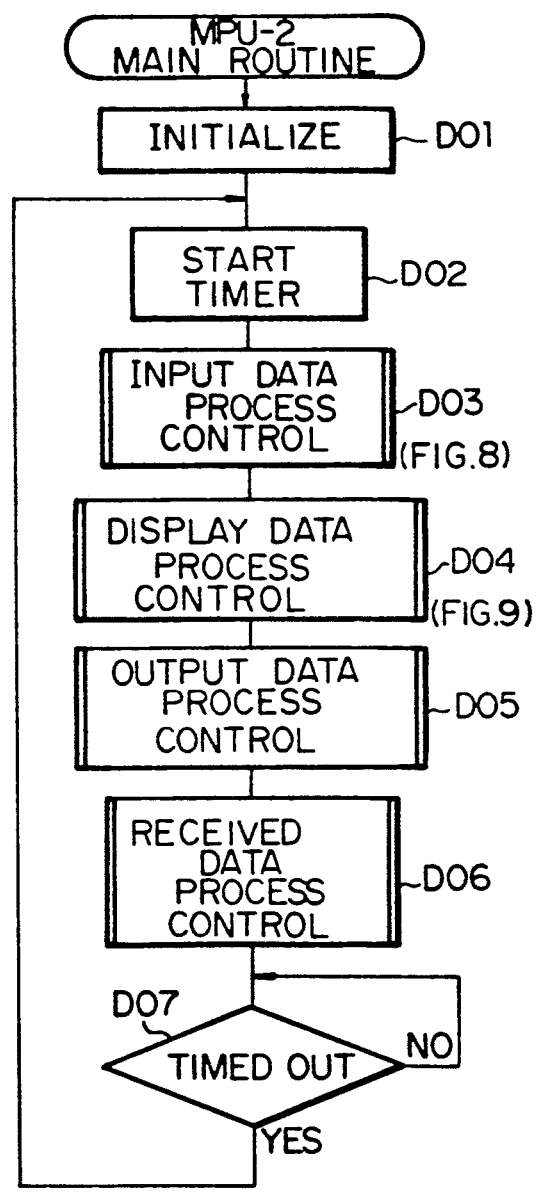
FIG. 7 is a flowchart showing a main routine program to be executed by a microprocessor forming part of a second subsidiary control unit included in the control system illustrated in FIG. 3.

FIG. 7 shows the main routine program to be executed by the microprocessor MPU-2 included in the second subsidiary control unit 44. The routine program herein shown starts to run with the image forming apparatus switched in and first initializes the microprocessor MPU-2 and the associated memory (not shown) so that all the conditions and modes of operation to be controlled by means of the subsidiary control unit 44 are selected in accordance with prescribed "default" rules. An internal timer of the microprocessor MPU-2 is then initiated into at step D02 to count a predetermined time interval allowed for a single complete iteration of the routine program.

The microprocessor MPU-2 then executes an input data process control subroutine program D03 through which the microprocessor MPU-2 processes various pieces of data which the microprocessor MPU-2 may have received from the control panel 22. These various pieces of data may include the data generated through manipulation of the print start key 26, numerical keys 28, clear/stop key 32 and/or zoom-in or zoom-out keys 34 and 36 on the control panel 22. If necessary, these pieces of data are loaded into the associated memory for relay to the microprocessor MPU-H. The details of this input data process control subroutine program D03 will be hereinafter described with reference to FIG. 8.

The input data process control subroutine program D03 is followed by a display data process control subroutine program D04 through which the microprocessor MPU-2 processes various pieces of data which are to be used for activation of the display and indicator elements included in the control panel 22. These pieces of data may include the data to activate one or both of the first and second display windows 30 and 38 on the control panel 22. The details of this display data process control subroutine program D04 will be hereinafter described with reference to FIG. 9.

Subsequently to the display data process control subroutine program D04, the microprocessor MPU-2 executes an output data process control subroutine program D05 through which the microprocessor MPU-2 processes various pieces of data to transmit to the master control unit 40. The microprocessor MPU-2 further executes a received data process control subroutine program D06 to process various data received from the microprocessor MPU-H. The details of these output data process control subroutine program D05 and received data process control subroutine program D06 are rather immaterial to the understanding of the subject matter of the present invention and as such will not be herein described. When it is thereafter confirmed at step D07 that the predetermined time interval which has been set at step D02 has lapsed, the microprocessor MPU-2 reverts to the step D02 and recycles the subroutine programs D03 to D07.

Input Data Process Control Subroutine (D03)

Figure 8A:
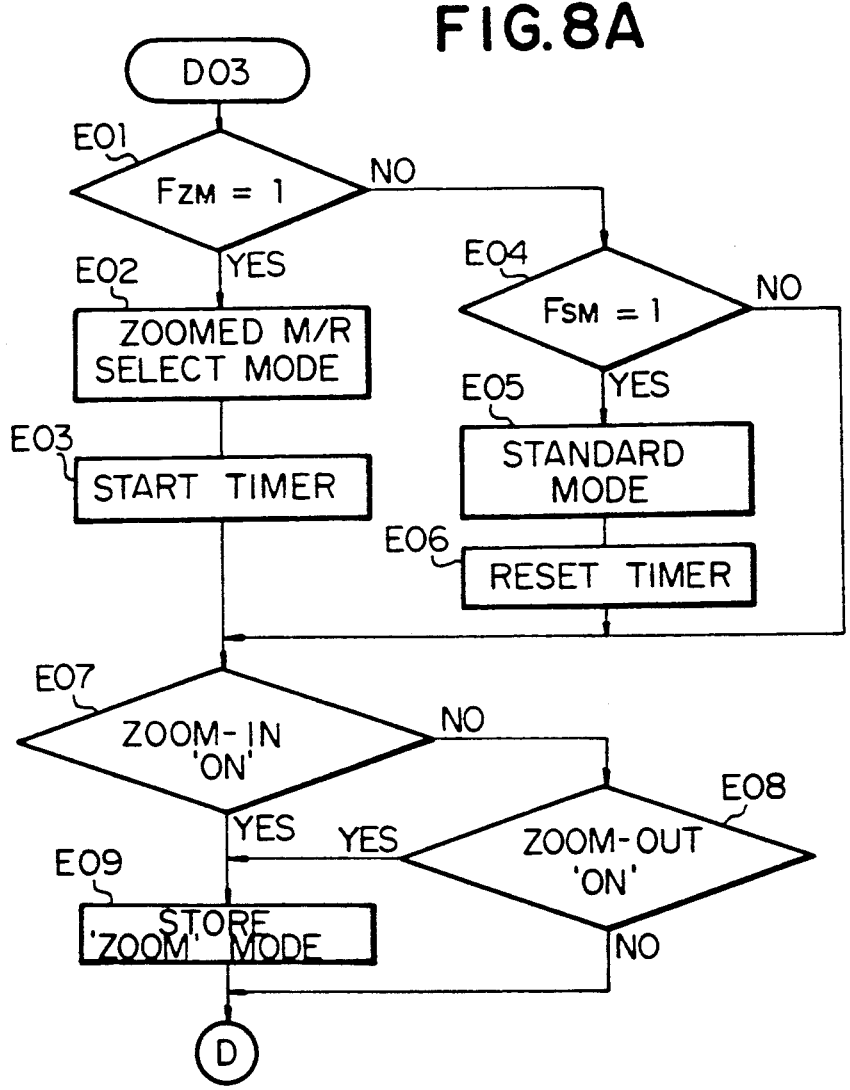

FIGS. 8A and 8B are flowcharts showing the details of the input data process control subroutine program D03 included in the main routine program illustrated in FIG. 7.

The input data process control subroutine program D03 herein shown starts with a decision step E01 at which the microprocessor MPU-2 in the subsidiary control unit 44 checks if the zoomed-magnification-ratio select mode grant flag $F_{ZM}$ of logic value "1" has been received from the microprocessor MPU-H. The zooming mode grant flag $F_{ZM}$ is transmitted from the microprocessor MPU-H to the microprocessor MPU-2 via the serial data transmission line 48 through execution of the interrupt "B" while the input/output data process control subroutine program A03 is being executed by the microprocessor MPU-H.

If it is found at this step E01 that there is the zooming mode grant flag $F_{ZM}$ of logic value "1" received from the master control unit 40, the microprocessor MPU-2 proceeds to step E02 to establish the zoomed magnification ratio select mode of operation in the control panel 22 so as to be prepared to receive data generated through manipulation of the zoom-in key 34 or the zoom-out key 36 by the operator. Subsequently to this step E02, the microprocessor MPU-2 proceeds to step E03 to start a display hold timer dictating the period of time for which a numerical value indicating a currently selected magnification ratio is to be indicated on the second display window 38 of the control panel 22. The display hold timer is activated in response to a signal generated with the zoom-in key 34 or zoom-out key 36 depressed by the operator.

On the other hand, if it is found at step E01 that there is not the zoomed-magnification-ratio select mode grant flag $F_{ZM}$ of logic value "1" received from the master control unit 40, then the microprocessor MPU-2 proceeds to step E04 to confirm whether or not the standard mode grant flag $F_{SM}$ of logic value "1" has been received from the microprocessor MPU-H. The standard mode grant flag $F_{SM}$ is transmitted from the microprocessor MPU-H to the microprocessor MPU-2 via the serial data transmission line 48 through execution of the step B06 of the input/output data process control subroutine program A03 by the microprocessor MPU-H. If it is found at this step E04 that there is the flag $F_{SM}$ of logic value "1" received from the master control unit 40, the microprocessor MPU-2 proceeds to step E05 to establish the standard mode of operation in the control panel 22. Subsequently to this step E04, the microprocessor MPU-2 proceeds to step E06 to reset the display hold timer.

Upon termination of the step E03 or step E06 or when it is found at step E04 that there is not the standard mode grant flag $F_{SM}$ of logic value "1" received from the master control unit 40, the microprocessor MPU-2 proceeds to step E07 to check if there is present a signal produced with the zoom-in key 34 depressed on the control panel 22. If it is found at this step E07 that there currently is present such a signal and as such the answer for the step E07 is given in the affirmative, the microprocessor MPU-2 directly proceeds to step E09. If however it is found that the answer for the step E07 is given in the negative, then the microprocessor MPU-2 proceeds to step E08 to check if there is present a signal produced with the zoom-out key 36 depressed on the control panel 22. If it is found at this step E08 that there currently is present such a signal, the microprocessor MPU-2 also proceeds to the step E09. At this step E09, the microprocessor MPU-2 stores data requesting selection of the zoomed magnification ratio select mode into an output data storage area of the memory in the microprocessor MPU-2. The data thus stored into the memory is to be fetched and transmitted to the microprocessor MPU-H through execution of the interrupt "B" routine program.

Subsequently to step E09 or when it is found that the answer for the step E08 is given in the negative, the microprocessor MPU-2 proceeds to step E10 shown in FIG. 8B.

At this step E10, the microprocessor MPU-2 checks if the zoomed magnification ratio select mode is still in effect with the zooming mode grant flag $F_{ZM}$ maintained at logic value "1". If it is found at this step E10 that the zoomed magnification ratio select mode is still in effect, the microprocessor MPU-2 proceeds to step E11 to check if the signal produced with the zoom-in key 34 depressed on the control panel 22 has terminated with the zoom-in key 34 released from the operator's manipulative effort. If it is found at this step E11 that the signal has already terminated and as such the answer for the step E11 is given in the affirmative, the microprocessor MPU-2 directly proceeds to step E13. If however it is found that the answer for the step E11 is given in the negative, then the microprocessor MPU-2 proceeds to step E12 to check if the signal produced with the zoom-out key 36 depressed on the control panel 22 has terminated with the zoom-out key 36 released from the operator's manipulative effort. If it is found at this step E12 that the signal has already terminated and accordingly the answer for the step E12 is given in the affirmative, the microprocessor MPU-2 also proceeds to the step E13.

At this step E13, the microprocessor MPU-2 sets the standard mode grant flag $F_{SM}$ to logic value "1" and stores data including the flag into an output data storage area of the memory associated with the microprocessor MPU-2. The data thus stored into the memory is to be fetched and transmitted to the microprocessor MPU-H through execution of the interrupt "B" routine program.

After the data including the standard mode grant flag $F_{SM}$ of logic value "1" is stored into the memory at step E13, the microprocessor MPU-2 proceeds to step E14 at which the data indicating the magnification ratio for duplication selected through manipulation of the zoom-in key 34 or zoom-out key 36 is stored into an output data storage area of the memory. The data thus stored into the memory is to be also fetched and transmitted to the microprocessor MPU-H through execution of the interrupt "B" routine program.

Upon termination of the step E14 or when it is found that the answer for the step E12 is given in the negative, the microprocessor MPU-2 proceeds to step E15 to process other pieces of data which the microprocessor MPU-2 may have received from the control panel 22.

Upon termination of the step E15, the microprocessor MPU-2 reverts to the main routine program illustrated in FIG. 7 and executes the display data process control subroutine program D04.

Display Data Process Control Subroutine (D03)

Figure 9:
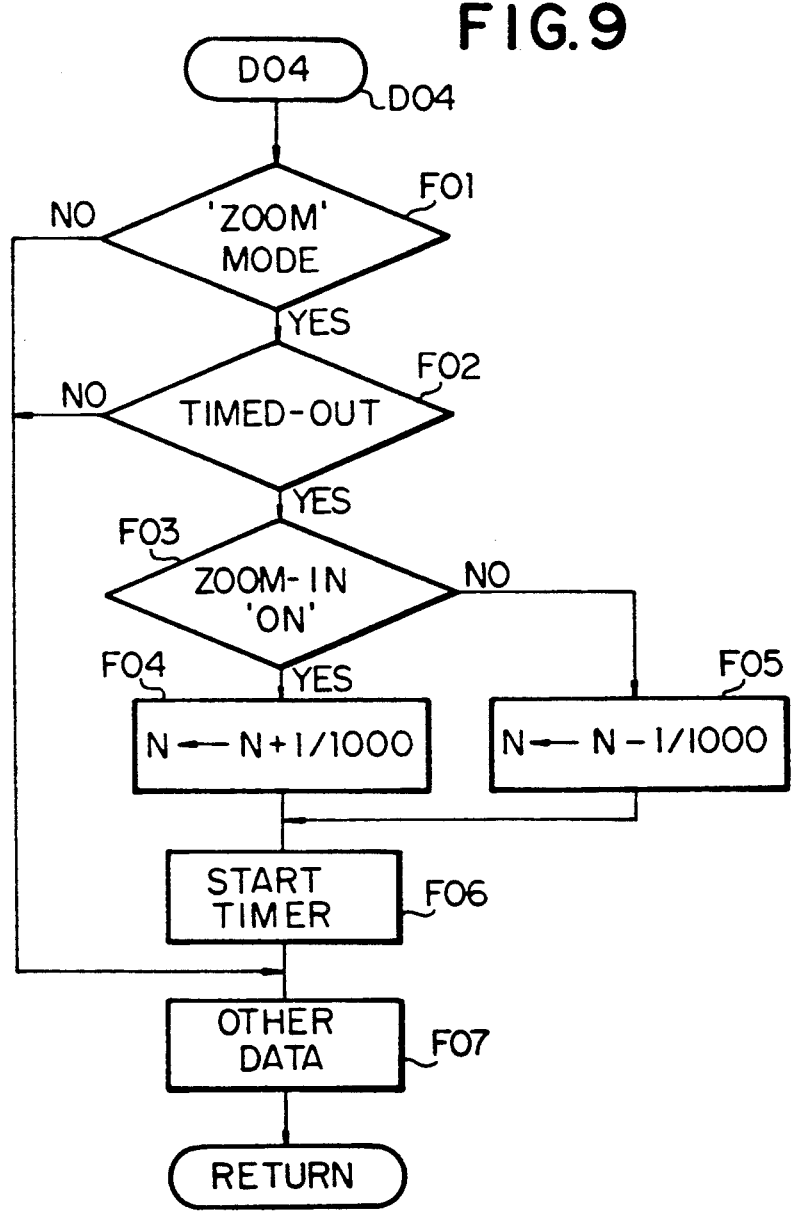
FIG. 9 is a flowchart showing the details of a display data process control subroutine program also included in the main routine program illustrated in FIG. 4.

FIG. 9 is a flowchart showing the details of the display data process control subroutine program D03 also included in the main routine program illustrated in FIG. 7.

The display data process control subroutine program D03 herein shown starts with a decision step F01 at which the microprocessor MPU-2 checks if the zoomed magnification ratio select mode is currently in effect with a signal present with the zoom-in or zoom-out key 34 or 36 depressed on the control panel. If it is found at this step F01 that the zoomed magnification ratio select mode of operation is currently established, the microprocessor MPU-2 proceeds to step F02 to detect whether or not the display hold timer started at step E03 of the input data process control subroutine program D03 described with reference to FIGS. 8A and 8B has terminated its counting operation. When it is confirmed at step F02 that the period of time set on the timer has lapsed, the microprocessor MPU-2 further proceeds to step F03 to detect if there is a signal present with the zoom-in key 34 depressed by the operator.

If it is determined at this step F03 that there currently is a signal present with the zoom-in key 34 depressed on the control panel 22, the step F03 is followed by step F04 at which the numerical value N of the currently selected magnification ratio indicated on the second display window 38 of the control panel 22 is incremented a single pitch value. Where the display window 38 is designed to be of the four-digit configuration as previously noted, a numerical value "1" is added to the current value at the lowest digit of the four-digit numerical value, which is accordingly increased by 1/1000 of the minimum four-digit value having "1" at the highest digit thereof.

If the answer for the step F02 is given in the negative, the microprocessor MPU-2 determines that it is the zoom-out 36 which is currently depressed by the operator. In this instance, the step F03 is followed by step F05 at which the numerical value N of the currently selected magnification ratio indicated on the second display window 38 of the control panel 22 is decremented a single pitch value. At this step F05, a numerical value "1" is deducted from the current value at the lowest digit of the four-digit numerical value, which is thus decreased by 1/1000 of the minimum four-digit value having "1" at the highest digit thereof.

After the numerical value indicated at the display window 38 is thus incremented or decremented a single pitch through execution of the step F04 or step F05, respectively, the microprocessor MPU-2 proceeds to step F06 to activate the display hold timer to start counting operation. The microprocessor MPU-2 proceeds to step F07 subsequently to this step F06 or when the answer for the step F01 or F02 is given in the negative. At this step F07, the microprocessor MPU-2 processes other pieces of data which may have been received from the control panel 22. These pieces of data may include those for the numerical value indicative of the selected quantity of printed outputs to be indicated on the first display window 30 of the control panel 22. Upon termination of the step F07, the microprocessor MPU-2 reverts to the main routine program illustrated in FIG. 7 and executes the output data process control subroutine program D05.

Interrupt "A" Subroutine

FIG. 10 is a flowchart showing the details of the interrupt "A" subroutine program predominant over the main routine program illustrated in FIG. 4. As previously noted, the interrupt of the type "A" is generated in the presence of a request for interrupt to the microprocessor MPU-1 in the first subsidiary control unit 42 or the microprocessor MPU-3 in the third subsidiary control unit 46 from the microprocessor MPU-H of the master control unit 40 or conversely from the microprocessor MPU-1 or MPU-3 to the microprocessor MPU-H. This type of interrupt is generated on supply of a system clock between the port SCK of the microprocessor MPU-H and the port SCK of the microprocessor MPU-1 or MPU-3 through the common bus line 58.

When there is a request for interrupt of the type "A", the microprocessor requested to interrupt its operation temporarily brings an end to the operation currently in progress and executes the interrupt "A". As shown in FIG. 10, the interrupt "A" routine program starts with a step G01 at which the microprocessor under consideration detects whether or not the interrupt currently requested is for the reception of data therein or the transmission of data therefrom. If it is determined at this step G01 that the interrupt currently requested is for the reception of data so that the answer for the step G01 is given in the affirmative, the microprocessor proceeds to step G02 to execute a data reception interrupt subroutine program. On the other hand, if it is determined at step G01 that the interrupt currently requested is for the transmission of data from the microprocessor under consideration, the answer for the step G01 is given in the negative and the microprocessor proceeds to step G03 to execute a data transmission interrupt subroutine program. The steps to be executed for these data reception and transmission interrupt subroutine programs G02 and G03 are well known in the art and for this reason will not be herein described.

After the data reception interrupt subroutine program G02 or the data transmission interrupt subroutine program G03 has been executed, the microprocessor unit under consideration proceeds to step G04 or step G05, respectively, and grants next interruption of the main routine program to receive data from the transmitter microprocessor or transmit data to the destination microprocessor. Upon termination of the step G04 or step G05, the microprocessor reverts to the main routine program illustrated in FIG. 4 and continues execution of the subroutine program which has been interrupted.

Interrupt "A" Subroutine

FIG. 11 is a flowchart showing the details of the interrupt "B" subroutine program predominant over the main routine program illustrated in FIG. 4 or FIG. 7. As previously noted, the interrupt of the type "B" is generated in the presence of a request for interrupt to the microprocessor MPU-2 from the microprocessor MPU-H or conversely from the microprocessor MPU-2 to the microprocessor MPU-H. The interrupt of the type "B" from the microprocessor MPU-H to the microprocessor MPU-2 is generated on transmission of the request for interrupt from the first data output port TD1 of the microprocessor MPU-H to the data input port RD of the microprocessor MPU-2 through the serial data transmission line 48. The interrupt of the type "B" from the microprocessor MPU-2 to the microprocessor MPU-H is generated on transmission of the request for interrupt from the data output port TD of the microprocessor MPU-2 to the first data input port RD1 of the microprocessor MPU-H through the serial data transmission line 52.

When there is a request for interrupt of the type "B", the microprocessor requested to interrupt its operation temporarily brings an end to the operation currently in progress and executes the interrupt "B" routine program. As shown in FIG. 11, the interrupt "B" routine program starts with a step H01 at which the microprocessor under consideration detects whether or not the interrupt currently requested is for the reception of data therein or the transmission of data therefrom.

If it is determined at this step H01 that the interrupt currently requested is for the reception of data so that the answer for the step H01 is given in the affirmative, the microprocessor proceeds to step H02 and grants next interruption of the main routine program to receive data from the transmitter microprocessor or transmit data to the destination microprocessor. Subsequently to step H02, the microprocessor of the control unit proceeds to step H03 to execute a data reception interrupt subroutine program. The next interruption being to be granted prior to the execution of the data reception interrupt subroutine program H03, multiple interruption is allowed for use.

On the other hand, if it is determined at step H01 that the interrupt currently requested is for the transmission of data from the microprocessor under consideration, the answer for the step H01 is given in the negative and the microprocessor under consideration proceeds to step H04 to execute a data transmission interrupt subroutine program. After the data transmission interrupt subroutine program H04 has been executed, the microprocessor proceeds to step H05 and grants interruption of the main routine program to transmit data to the destination control unit. Upon termination of the step H03 or step H05, the microprocessor of the control unit reverts to the main routine program illustrated in FIG. 4 or FIG. 7 and continues execution of the subroutine program which has been interrupted. The steps to be executed for the data reception and transmission interrupt subroutine programs H03 and H04 are also well known in the art and for this reason will not be herein described.

Figure 12:
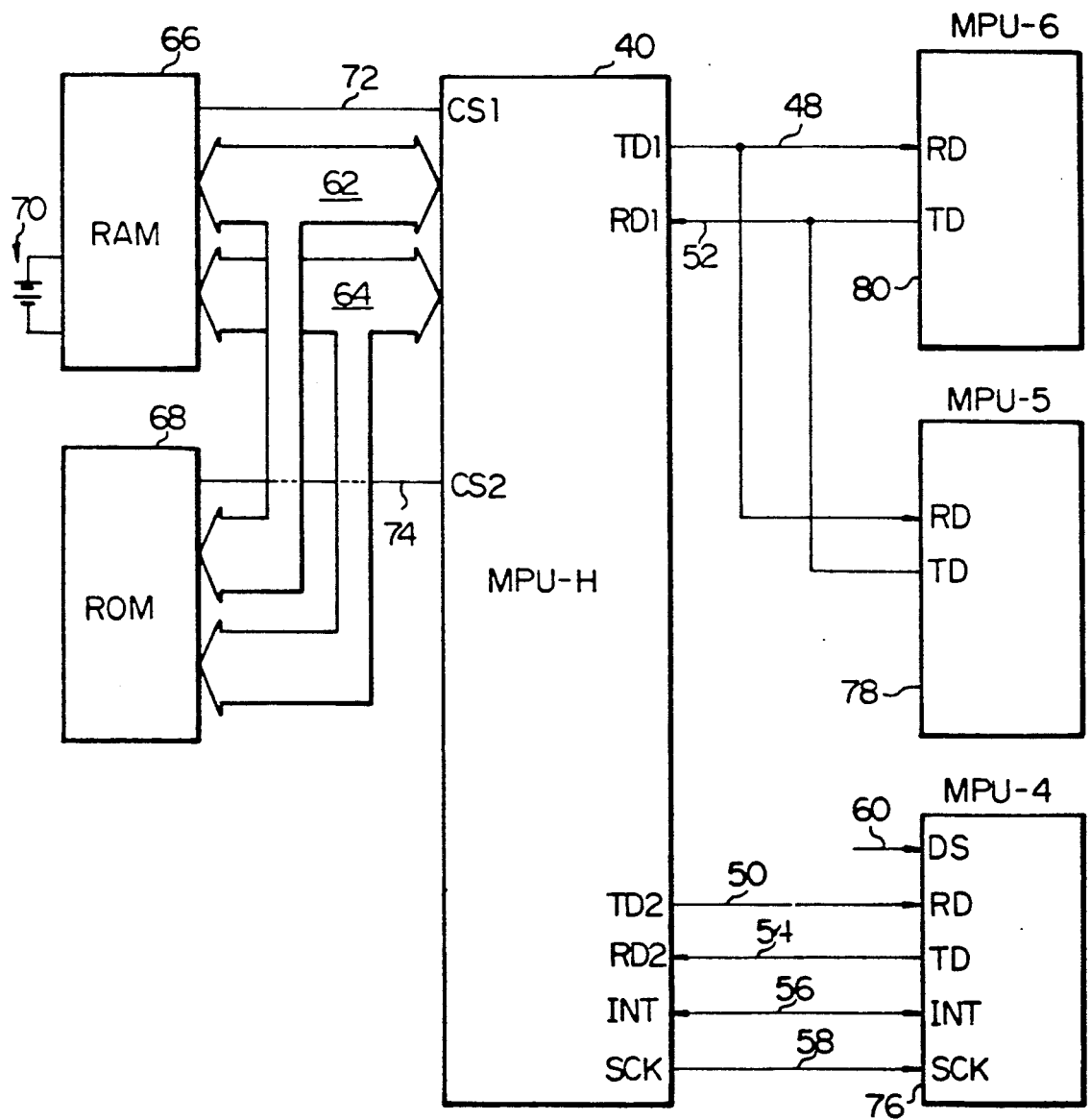
FIG. 12 is a block diagram showing the general circuit arrangement of a modification of the control system illustrated in FIG. 3.

While it has been assumed that the present invention has been applied to an electrophotographic image duplicating apparatus by way of example, advantages similar to those achieved by such an embodiment can be obtained when the present invention is embodied in a digital copier or a printer apparatus of any type. Where the present invention is to be applied to a printer apparatus, minor modification of the control system would be necessitated to cope with the additional functional modules including an image reader module provided in addition to the counterparts of the image reproducing module, control panel and page sorter module of the image forming apparatus of the character hereinbefore described. FIG. 12 shows the general circuit arrangement of an example of such a modification of the control system adapted for use in a printer apparatus including an image reader module.

Though not shown in the drawings, the printer apparatus in which the modified control system herein shown is incorporated comprises a print engine which is the counterpart of the image reproducing module 20 of the described image forming apparatus, a control panel, and an image reader module. Accordingly, the control system comprises a master control unit 40 and a plurality of subsidiary control units including first, second and third subsidiary control units 76, 78 and 80. The first subsidiary control unit 76 is particularly associated with and in control of the print engine module reproducing visible images on a print sheet. The second subsidiary control unit 78 is particularly associated with and in control of the control panel and processes the various signals to be received from and supplied to the control panel. The third subsidiary control unit 80 is associated with the operation of the image reader module. These first, second and third subsidiary control units 76, 78 and 80 are capable of communicating with the master control unit 40 independently of one another and control the operations of the respectively associated functional modules.

In the control system herein shown, there are also used communication networks of the leased transmission line type and common interface bus type type. Between the master control unit 40 and the first subsidiary control unit 76 in control of the print engine is used a data communication network of the common interface bus type, while a data communication network of the leased transmission line type is used between the master control unit 40 and each of the second and third subsidiary control units 78 and 80 in control of the control panel and image reader module, respectively. Communication of data through the leased transmission line network is performed in the polling mode of communication as previously described.

Each of the master control unit 40 and subsidiary control units 76, 78 and 80 of the control system herein shown also comprises a semiconductor microprocess such as, as shown, a microprocessor MPU-H forming part of the master control unit 40, a microprocessor MPU-4 forming part of the subsidiary control unit 76, a microprocessor MPU-5 forming part of the subsidiary control unit 78, and a microprocessor MPU-6 forming part of the subsidiary control unit 80.

The microprocessor MPU-H included in the master control unit 40 has a first data output port TD1 connected through a serial data transmission line 48 to a data input port RD of each of the microprocessor MPU-5 of the second subsidiary control unit 78 and the microprocessor MPU-6 of the third subsidiary control unit 80, and a second data output port TD2 connected through a common bus line 50 to a data input port RD of the microprocessor MPU-4 of the first subsidiary control unit 76. The microprocessor MPU-H further has a first data input port RD1 connected through a serial data transmission line 52 to a data output port TD of each of the microprocessor MPU-5 and the microprocessor MPU-6, and a second data input port RD2 connected through a common bus line 54 to a data output port TD of the microprocessor MPU-4. The microprocessor MPU-H further has an interrupt port INT and a system clock port SCK. The interrupt port INT of the microprocessor MPU-H is connected through a common bus line 56 to an interrupt port INT of the microprocessor MPU-4. The system clock port SCK of the microprocessor MPU-H is connected through a common bus line 58 to a system clock port SCK of the microprocessor MPU-4.

The microprocessor MPU-4 in control of the print engine module in particular further has a plurality of failure detect signal input terminals DS which are similar to their counterparts described with reference to FIG. 3. The failure detect signal input terminals DS are thus connected through lines 60 to various sensors and detectors (not shown) located within the print engine module of the apparatus to receive signals indicative of the occurrences of failures which may be invited within the module. In response to a failure detect signal thus received from any of such sensors and detectors provided in the print engine module, the microprocessor MPU-4 generates failure detect data and sends the failure detect data to the microprocessor MPU-H by way of the common bus line 54.

The microprocessor MPU-H forming part of the master control unit 40 is connected through an address bus 62 and a data bus 64 to a random-access memory 66 and a read-only memory 68 which are also similar to their respective counterparts provided in the control system described with respect to FIG. 3 and, thus, the memory 66 is provided with a backup or refreshing power supply source 70. Each of the microprocessors MPU-4, MPU-5 and MPU-6 of the subsidiary control units 76, 78 and 80, respectively, also has associated random-access and read-only memories basically similar in function to these memories 66 and 68 associated with the microprocessor MPU-H. The microprocessor MPU-H further has chip select ports CS1 and CS2 connected through lines 72 and 74 to the memories 66 and 68, respectively.

The first subsidiary control unit MPU-4 in control of the print engine module operates similarly to the first and third subsidiary control units MPU-1 and MPU-3 in the control system in the first preferred embodiment of the present invention. Thus, the subsidiary control unit MPU-4 has the standard mode of operation in which the subsidiary control unit operates under the control of the master control unit 40. In contrast to such a functional module, each of the control panel and image reader module implementing the second and third functional modules, respectively, is allowed to select either the standard mode of operation or the local mode of operation. Thus, the control system shown in FIG. 12 operates basically similarly to the system described with reference to FIG. 3 in accordance with the main routine programs hereinbefore described with reference to FIG. 4 in regard to the master control unit 40 or with reference to FIG. 7 in regard to the second or third subsidiary control unit 78 or 80.

As will have been understood from the foregoing description, an image forming apparatus according to the present invention includes a plurality of functional modules each having particular functions proper to the unit and features an improved control system having a master control unit and a plurality of subsidiary control units respectively in control of the individual functional modules wherein each of the plurality of subsidiary control units operates principally under the the control of the master control unit through a communication network of the common interface bus type but is operable independently of the master control unit when required or preferred by the subsidiary control unit per se. The subsidiary control unit 78 and each of the subsidiary control units of the control system of an image forming apparatus according to the present invention are thus allowed to partake of portions the software programs to be executed by the system as a whole and are accordingly required to bear reduced amounts of burden in communicating with each other.

What is claimed is:

1. An image forming apparatus having at least one functional module and a control system comprising
   a) first control means in control of said functional module, and
   b) second control means capable of communicating with the first control means, said second control means being operative to control the first control means by communicating with the first control means to supervise the operation of the image forming apparatus,
   c) said functional module having a standard mode of operation in which the functional module operates under the control of said first control means operating under the control of the second control means and a local mode of operation in which the functional module operates under the control of said first control means, said standard mode and said local mode being concurrently incompatible with each other in said functional module.

2. An image forming apparatus as set forth in claim 1, further comprising d) failure detecting means for detecting a failure invited in the image forming apparatus and supplying failure detect information indicative of the occurrence of said failure to said second control means so that said second control means means controls said first control means to incorporate the functional mode into the standard mode.

3. An image forming apparatus as set forth in claim 1, in which said first control means is enabled to select said local mode in said functional module by permission of said second control means.

4. An image forming apparatus including first and second functional modules and a control system comprising a) first and second subsidiary control means in control of said first and second functional modules, respectively, and b) single master control means which may be coupled to each of said first and second subsidiary control means for being in control of each of the first and second subsidiary control means, c) said first functional module having a standard mode of operation in which the functional module operates under the control of said first subsidiary control means operating under the control of said master control means, d) said second functional module having a standard mode of operation in which the functional module operates under the control of said second subsidiary control means operating under the control of said master control means and a local mode of operation in which the functional module operates under the control of said second subsidiary control means operating independently of said master control means, the local mode of said second functional module being concurrently incompatible with the standard mode of each of the first and second functional modules.

5. An image forming apparatus as set forth in claim 4, further comprising d) failure detecting means for detecting a failure invited in the image forming apparatus and supplying failure detect information indicative of the occurrence of said failure to said master control means and enabling said second functional module to operate exclusively in said standard mode in the presence of the failure detect information transferred from said master control means to said second subsidiary control means.

6. An image forming as set forth in claim 4, in which said second subsidiary is enabled to select said local mode in said second functional module by permission of said master control means.

7. An image forming apparatus having at least one functional module and a control system comprising first control means in control of said functional module and second control means capable of communicating with the first control means, wherein said functional module has a standard mode of operation in which the functional module operates under the control of said first control means and a local mode of operation in which the functional module operates under the control of said second control means, said standard mode of operation and said local mode of operation being concurrently incompatible with each other in said functional module.

8. An image forming apparatus including first and second functional modules and a control system comprising first and second subsidiary control means in control of said first and second functional modules, respectively, and single master control means which may be coupled to each of said first and second subsidiary control means for being in control of each of the first and second subsidiary control means, wherein said first functional module has a standard mode of operation in which the functional module operates under the control of said first subsidiary control means operating under the control of said master control means and said second functional module has a standard mode of operation in which the functional module operates under the control of said second subsidiary control means operating under the control of said master control means and a local mode of operation in which the functional module operates under the control of said second subsidiary control means operating independently of said master control means, the local mode of operation of said second functional module being concurrently incompatible with the standard mode of operation of each of the first and second functional modules.

9. An image forming apparatus having at least one functional module and a control system comprising a) first control means in control of said functional module, b) second control means capable of communicating with the first control means, c) said functional module having a standard mode of operation in which the functional module operates under the control of said first control means and a local mode of operation in which the functional module operates under the control of said second control means, said standard mode of operation and said local mode of operation being concurrently incompatible with each other in said functional module, and d) failure detecting means for detecting a failure invited in the image forming apparatus and supplying failure detect information indicative of the occurrence of said failure to said second control means and enabling said functional module to operate exclusively in said standard mode of operation in the presence of the failure detect information transferred from said second control means to said first control means.

10. An image forming apparatus including first and second functional modules and a control system comprising a) first and second subsidiary control means in control of said first and second functional modules, respectively, b) single master control means which may be coupled to each of said first and second subsidiary control means for being in control of each of the first and second subsidiary control means, c) said first functional module having a standard mode of operation in which the functional module operates under the control of said first subsidiary control means operating under the control of said master control means, d) said second functional module having a standard mode of operation in which the functional module operates under the control of said second subsidiary control means operating under the control of said master control means and a local mode of operation in which the functional module operates under the control of said second subsidiary control means operating independently of said master control means, the local mode of operation of said second functional module being concurrently incompatible with the standard mode of operation of each of the first and second functional modules, and e) failure detecting means for detecting a failure invited in the image forming apparatus and supplying failure detect information indicative of the occurrence of said failure to said master control means and enabling said second functional module to operate exclusively in said standard mode of operation in the presence of the failure detect information transferred from said master control means to said second subsidiary control means.

11. An image forming apparatus having at least one functional module and a control system comprising first control means in control of said functional module and second control means capable of communicating with the first control means, wherein said functional module has a standard mode of operation in which the functional module operates under the control of said first control means and a local mode of operation in which the functional module operates under the control of said second control means, said standard mode of operation and said local mode of operation being concurrently incompatible with each other in said functional module, and wherein said first control means is enabled to select said local mode of operation in said functional module by permission of said second control means.

12. An image forming apparatus including first and second functional modules and a control system comprising a) first and second subsidiary control means in control of said first and second functional modules, respectively, b) single master control means which may be coupled to each of said first and second subsidiary control means for being in control of each of the first and second subsidiary control means, c) said first functional module having a standard mode of operation in which the functional module operates under the control of said first subsidiary control means operating under the control of said master control means, d) said second functional module having a standard mode of operation in which the functional module operates under the control of said second subsidiary control means operating under the control of said master control means and a local mode of operation in which the functional module operates under the control of said second subsidiary control means operating independently of said master control means, the local mode of operation of said second functional module being concurrently incompatible with the standard mode of operation of each of the first and second functional modules, e) said second subsidiary control means being enabled to select said local mode of operation in said second functional module by permission of said master control means.

13. An image forming apparatus including first and second functional modules and a control system comprising (a) first and second subsidiary control means in control of said first and second functional modules, respectively, (b) single master control means which may be coupled to each of said first and second subsidiary control means for being in control of each of the first and second subsidiary control means, (c) first coupling means for coupling said first subsidiary control means to said master control means for allowing the master control means and first subsidiary control means to communicate at any time with each other through said first coupling means, (d) second coupling means for coupling said second subsidiary control means to said master control means for allowing the master control means and the second subsidiary control means to periodically communicate with each other through said second coupling means, (e) said first functional module having a standard mode of operation in which the functional module operates under the control of said first subsidiary control means operating under the control of said master control means and a local mode of operation in which the functional module operates under the control of said first subsidiary control means operating independently of said master control means, (f) said second functional modules having a standard mode of operation in which the functional module operates under the control of said second subsidiary control means operating under the control of said master control means (g) the local mode of operation of said first functional module being concurrently incompatible with the standard mode of operation of each of the first and second functional modules.

14. An image forming apparatus as set forth in claim 13, in which said control system further comprises failure detecting means for detecting a failure invited in the image forming apparatus and supplying failure detect information indicative of the occurrence of said failure to said master control means and enabling said first functional module to operate exclusively in said standard mode in the presence of the failure detect information transferred from said master control means to said first subsidiary control means.

15. An image forming apparatus as set forth in claim 13, in which said first subsidiary control means is enabled to select said local mode in said first functional module by permission of said master control means.

* * * * *